US011601853B2

(12) United States Patent
Deng et al.

(10) Patent No.: US 11,601,853 B2
(45) Date of Patent: Mar. 7, 2023

(54) METHOD OF AND APPARATUS FOR CONTROLLING PROSE SERVICE IN COMMUNICATION SYSTEM

(71) Applicant: Alcatel Lucent, Boulogne Billancourt (FR)

(72) Inventors: Yun Deng, Shanghai (CN); Seau Sian Lim, Swindon (GB); Yong Liu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 799 days.

(21) Appl. No.: 15/329,748

(22) PCT Filed: Jul. 23, 2015

(86) PCT No.: PCT/IB2015/001371
§ 371 (c)(1),
(2) Date: Jan. 27, 2017

(87) PCT Pub. No.: WO2016/016715
PCT Pub. Date: Feb. 4, 2016

(65) Prior Publication Data
US 2017/0223584 A1    Aug. 3, 2017

(30) Foreign Application Priority Data

Jul. 28, 2014   (CN) .......................... 201410363429.7

(51) Int. Cl.
*H04W 76/23*    (2018.01)
*H04W 76/28*    (2018.01)
(Continued)

(52) U.S. Cl.
CPC ....... *H04W 36/0072* (2013.01); *H04W 48/08* (2013.01); *H04W 72/0446* (2013.01);
(Continued)

(58) Field of Classification Search
CPC ..... H04W 76/28; H04W 76/23; H04W 76/27; H04W 48/08; H04W 72/0446; H04W 36/0079
See application file for complete search history.

(56) References Cited

U.S. PATENT DOCUMENTS

2009/0287827 A1   11/2009   Horn et al.
2010/0240367 A1*   9/2010   Lee .................. H04W 36/0077
                                                        455/435.2
(Continued)

FOREIGN PATENT DOCUMENTS

CN    103037471 A    4/2013
CN    103582127 A    2/2014
(Continued)

OTHER PUBLICATIONS

General Dynamics Broadband UK, "Consideration of isolated access ProSe scenarios," 3rd Generation Partnership Project (3GPP), 3GPP TSG-SA WG2, S2-130358, 5 pages, XP050684893, Prague, Czech Republic, Jan. 26-30, 2013.
(Continued)

Primary Examiner — Angel T Brockman
(74) Attorney, Agent, or Firm — Fay Sharpe LLP

(57) ABSTRACT

The invention provides a method of and apparatus for controlling a ProSe service in a communication system. An eNB sends a first PLMN identifier, and carrier frequency information of another PLMN to indicate at least one carrier frequency at which a UE of the other PLMN can carry out the ProSe service, to a UE in a shared cell, and if the UE is in an idle state, then the UE reselects a cell or selects a PLMN; or if the UE is in a connected state, then the UE performs a handover procedure. If the handover procedure fails, then the UE releases an RRC connection to enter the idle states, or is DRX-configured and carries out the ProSe service in a DRX sleep time. With the solution of the
(Continued)

invention, the UE can reselect or be handed over to the cell to carry out the ProSe service at the carrier frequency indicated by the carrier frequency information to thereby avoid the problem of an overload arising from too many ProSe services being carried out concurrently in the shared cell.

19 Claims, 6 Drawing Sheets

(51) Int. Cl.
  *H04W 48/08* (2009.01)
  *H04W 76/27* (2018.01)
  *H04W 36/00* (2009.01)
  *H04W 72/04* (2009.01)
  *H04W 72/0446* (2023.01)
  *H04W 36/08* (2009.01)

(52) U.S. Cl.
  CPC .......... *H04W 76/23* (2018.02); *H04W 76/27* (2018.02); *H04W 76/28* (2018.02); *H04W 36/0079* (2018.08); *H04W 36/08* (2013.01)

(56) References Cited

U.S. PATENT DOCUMENTS

| | | | |
|---|---|---|---|
| 2013/0208644 A1* | 8/2013 | Jung | H04W 4/08 370/312 |
| 2013/0288668 A1 | 10/2013 | Pragada et al. | |
| 2014/0056220 A1 | 2/2014 | Poitau et al. | |
| 2014/0153509 A1 | 6/2014 | Guo | |
| 2014/0235237 A1* | 8/2014 | Shin | H04W 48/16 455/434 |
| 2015/0222401 A1 | 8/2015 | Xu et al. | |
| 2015/0223279 A1 | 8/2015 | Jiao et al. | |
| 2016/0014673 A1 | 1/2016 | Jang et al. | |
| 2016/0014835 A1* | 1/2016 | Wu | H04W 8/005 370/329 |
| 2017/0223669 A1 | 8/2017 | Ma et al. | |

FOREIGN PATENT DOCUMENTS

| | | |
|---|---|---|
| CN | 103686691 A | 3/2014 |
| CN | 103748811 A | 4/2014 |
| JP | 2017-525320 A | 8/2017 |
| KR | 20120069855 | 6/2012 |
| KR | 1020170029005 | 3/2017 |
| WO | WO 2013/022298 A2 | 2/2013 |
| WO | WO 2013/038325 A1 | 3/2013 |
| WO | WO 2016/004903 | 1/2016 |

OTHER PUBLICATIONS

RAN3, "Reply LS on clarifications about MOCN and GWCN," 3$^{rd}$ Generation Partnership Project (3GPP), SA WG2 Meeting #S2-104, S2-142301_R3-141523, 2 pages, XP050836728, Dublin, Ireland, Jul. 7-11, 2014.
RAN WG2, "LS on Access control for UEs in RRC Connected mode," 3$^{rd}$ Generation Partnership Project (3GPP), SA WG2 Meeting #S2-97, , S2-131766_resubmitted S2-130006_S2-124200_S2-1 23471_R2-124296, 2 pages, XP050708792, Busan, South Korea, May 27-31, 2013.
International Search Report for PCT/IB2015/001371 dated May 18, 2016.

* cited by examiner

METHOD OF AND APPARATUS FOR
CONTROLLING PROSE SERVICE IN
COMMUNICATION SYSTEM

FIELD OF THE INVENTION

The present disclosure relates to a communication system, and particularly to a method of and apparatus for controlling a Proximity-based Service (ProSe) service in a communication system.

BACKGROUND OF THE INVENTION

The introduction of a Proximity-based Service (ProSe) to the LTE system has been approved. At present the RAN 1/2 has achieved a great progress on a Device to Device (D2D) discovery and communication.

According to the agreed-on R2-141859, if direct communication is required for a ProSe-enabled User Equipment (UE), then a resource can is be allocated in the following two modes:

In the mode 1, an eNB schedules resource allocation:
  The UE will transmit data in the connected state (RRC_CONNECTED).
  The UE requests the eNB for a transmission resource. The eNB schedules a transmission resource for the UE to transmit a Scheduling Assignment (SA) and data.
  The UE sends a scheduling request (using a D-SR or in a random access) to the eNB, which is followed by a Buffer status Report (BSR). Based upon the BSR, the eNB can determine that the UE has some amount of data to be transmitted in ProSe direct communication, and estimate a resource required for the transmission.

In the mode 2, the UE itself selects a resource.
  The UE itself selects a resource from a pool of resources to transmit a scheduling assignment and data.

For direct communication between devices, if the UE is being served by a cell (that is, the UE is in the RRC connected state (RRC_CONNECTED) or in the RRC idle state (RRC_IDLE)), but can camp normally on the cell (to receive a system message, to receive a paging message, etc.), then the UE will be considered as "in a coverage area (in-coverage)", and the following rules will apply for the UE:

If the UE is out of the coverage area, then the UE can only operate in the mode 2;
  If the UE is in the coverage area and configured by the eNB accordingly, then it may operate in the mode 1;
  If the UE is in the coverage area and configured by the eNB accordingly, then it may operate in the mode 2;
  If the UE is in the coverage area, then it can only operate in an indicated mode configured by the eNB unless an exceptional case occurs, is and when an exceptional case occurs, the UE may be allowed to operate temporarily in the mode 2 even if the UE has been configured to operate in the mode 1.

If the ProSe-enabled UE needs to make a direct discovery, then a resource can be allocated in the following two types:

In the type 1, a resource for announcing discovery information will not be allocated as a UE specific resource:
  The eNB provides the UE with a configured pool of resources for announcing discovery information by sending the configured pool via SIB signaling; and
  The UE itself selects a radio resource from the indicated pool of resources, and announces discovery information.

In the type 2, a resource for announcing discovery information will not be allocated as a UE specific resource:
  The UE in the RRC connected state requests the eNB via RRC for a resource for announcing discovery information; and
  The eNB assigns a resource via RRC.

In fact, the current network is a shared network, but the UE may be only authorized in the shared network to carry out a ProSe service in a specific Public Land Mobile Network (PLMN), so the rules will not be applicable to the shared network because they may cause an unauthorized UE in the specific PLMN to carry out a ProSe service authorized in another PLMAN, in a shared cell.

Besides the UE shall access the network to request for allocating resources for direct communication in the mode 1 and a direct discovery in the type 2. The UE shall access the network to obtain authorization information before it carries out the ProSe service. This may significantly increase a load of the network if there are many UEs expecting to carry out the ProSe services at the same time. Until now, any UE carrying the ProSe service will not be barred in the current network for an access to the network. If the existing access control mechanism is enforced, then a normal UE will be hindered from carrying out a normal service.

In view of this, it is desirable to provide a solution to controlling a ProSe service.

SUMMARY OF THE INVENTION

A general idea of the invention lies in that a first PLMN identifier and information about at least one carrier frequency of another PLMN are sent in a shared cell to a UE of the shared cell, so that a UE of the other PLMN can carry out a ProSe service at the carrier frequency indicated by the information about the carrier frequency by reselecting or handing over to a cell to thereby avoid the problem of an overload arising from too many ProSe services being carried out concurrently in the shared cell.

According to a first aspect of the invention, there is provided a method of controlling a ProSe service in an eNB of a communication system, the method including the steps of: A. sending in a shared cell a first PLMN identifier to a UE of the shared cell, wherein the first PLMN identifier indicates that a UE of the first PLMN can carry out the ProSe service in the shared cell controlled by the eNB and shared by the first PLMN and other PLMN.

According to an embodiment of the invention, after the step A, the method further includes: B. sending information about at least one carrier frequency of the other PLMN to the UE of the shared cell in the shared cell, wherein the information about the at least one carrier frequency indicates the at least one carrier frequency at which a UE of the other PLMN can carry out the ProSe service; and C. if the UE of the other PLMN intends to carry out the ProSe service in the other PLMN, then determining whether the UE of the other PLMN is in a connected state, and if so, then initiating a handover procedure.

According to an embodiment of the invention, after the step C, the method further includes: D1. if the handover procedure fails, sending an RRC connection release instruction to the UE of the other PLMN to is instruct the UE of the other PLMN to release an RRC connection with the eNB to enter an idle state.

According to an embodiment of the invention, after the step C, the method further includes: D2. if the handover procedure fails, receiving a release connection request from the UE of the other PLMN, and sending an RRC connection release instruction to the UE of the other PLMN, in response to the received release connection request, to instruct the UE of the other PLMN to release an RRC connection with the eNB to enter an idle state.

According to an embodiment of the invention, after the step C, the method further includes: D3. if the handover procedure fails, sending DRX configuration information to the UE of the other PLMN, wherein the DRX configuration information indicates an sleep time in which the UE of the other PLMN carries out the ProSe service.

According to an embodiment of the invention, after the step A, the method further includes: H. sending a first period of time in which the ProSe service is carried in the shared cell, corresponding to the first PLMN to the UE; L. sending the other PLMN identifier, and a second period of time in which the ProSe service is carried in the shared cell, corresponding to the other PLMN identifier to the UE; and D4. receiving information about a radio resource for carrying out the ProSe service in the other PLMN, from the UE of the other PLMN, wherein the information about the radio resource includes a time window corresponding to the radio resource, and the time window locates in the second period of time.

According to an embodiment of the invention, after the step D4, the method further includes: D41. avoiding the UE of the other PLMN from being scheduled in the shared cell in the time window.

According to an embodiment of the invention, in the handover procedure, a switch request message sent to a destination eNB includes ProSe service information and/or a buffer status report about the ProSe is service.

According to a second aspect of the invention, there is provided a method of controlling a ProSe service in a UE of a communication system, the method including the steps of:
a. receiving a first PLMN identifier from an eNB of a shared cell, wherein the first PLMN identifier indicates that a UE of the first PLMN can carry out the ProSe service in the shared cell controlled by an eNB and shared by the first PLMN and other PLMN.

According to an embodiment of the invention, after the step a, the method further includes: b. receiving information about at least one carrier frequency of the other PLMN from the eNB, wherein the information about the at least one carrier frequency indicates the at least one carrier frequency at which a UE of the other PLMN can carry out the ProSe service; and c. if the UE of the other PLMN intends to carry the ProSe service in the other PLMN, and is in an idle state, reselecting a cell; or if the UE of the other PLMN intends to carry the ProSe service in the other PLMN, and is in a connected state, sending an indicator of the intension to carry out the ProSe service, to the eNB.

According to an embodiment of the invention, after the step c, the method further includes: d0. if the handover succeeds, switching the UE of the other PLMN to an appropriate cell for carrying out the ProSe service to carry out the ProSe service.

According to an embodiment of the invention, after the step c, the method further includes: d1. if the UE of the other PLMN has not been handed over from the shared cell to another cell in a period of time after sending the indicator of the intension to carry out the ProSe service to the eNB, receiving an RRC connection release instruction from the eNB, and releasing an RRC connection with the eNB and entering the idle state, in response to the RRC connection release instruction.

According to an embodiment of the invention, after the step c, the method further includes: d2. if the UE of the other PLMN has not been handed over from the shared cell to another cell in a period of time after is sending the indicator of the intension to carry out the ProSe service to the eNB, sending a release connection request to the eNB, and releasing an RRC connection with the eNB and entering the idle state, in response to a received RRC connection release instruction from the eNB.

According to an embodiment of the invention, the method further includes: e. if the UE of the other PLMN is in the idle state, selecting, by the UE of the other PLMN, preferentially a cell at the at least one carrier frequency, and selecting a PLMN and reselecting the appropriate cell for carrying out the ProSe service at the at least one carrier frequency to carry out the ProSe service.

According to an embodiment of the invention, after the step c, the method further includes: d3. if the UE of the other PLMN has not been handed over from the shared cell to another cell in a period of time after sending the indicator of the intension to carry out the ProSe service to the eNB, receiving DRX configuration information from the eNB, wherein the DRX configuration information includes an sleep time in which the UE of the other PLMN carries out the ProSe service.

According to an embodiment of the invention, after the step d3, the method further includes: d31. carrying out the ProSe service at the at least one carrier frequency in the DRX sleep time according to the DRX configuration information, and the information about the at least one carrier frequency.

According to an embodiment of the invention, after the step a, the method further includes: h. receiving a first period of time in which the ProSe service is carried out in the shared cell, corresponding to the first PLMN, from the eNB; l. receiving the other PLMN identifier, and a second period of time in which the ProSe service is carried out in the shared cell, corresponding to the other PLMN identifier, from the eNB; and d4. sending information about a radio resource over which the ProSe service is carried out in the other PLMN, to the eNB, wherein the information about the radio resource includes a time window is corresponding to the radio resource, in the second period of time, and the information about the radio resource is configured to instruct the eNB not to schedule the UE of the other PLMN in the shared cell in the time window.

According to a third aspect of the invention, there is provided a method of controlling a ProSe service in a UE of a communication system, the method including the steps of:
S71. sending access class barring information for carrying out the ProSe service to a UE authorized to carry out the ProSe service in a first PLMN; S731. receiving a request from the UE for a radio resource for carrying out the ProSe service after establishing an RRC connection with the UE; and S74. sending information about the radio resource for carrying out the ProSe service to the UE in response to the request from the UE for the radio resource for carrying out the ProSe service, wherein the information about the radio resource includes a time window corresponding to the radio resource.

According to an embodiment of the invention, the access class barring information is PLMN specific or applicable to all of PLMNs of the shared cell.

According to an embodiment of the invention, the access class barring information includes ProSe discovery barring information and/or ProSe communication barring information.

According to an embodiment of the invention, the access class barring information further includes PLMN identifier information indicating PLMNs to which the access class barring information is applicable.

According to a fourth aspect of the invention, there is provided a method of controlling a ProSe service in a UE of a communication system, the method including the steps of: S72. making an access decision according to access class barring information for carrying the ProSe service in a first PLMN, from an eNB, and if the decision succeed, sending an RRC connection request to the eNB for setting up an RRC connection with the eNB, wherein the UE is authorized to carry out the is ProSe service in the first PLMN; S73. sending a request for a radio resource for carrying out the ProSe service to the eNB; and S75. carrying out the ProSe service in a time window corresponding to the radio resource in information about the radio resource for carrying out the ProSe service, from the eNB.

According to a fifth aspect of the invention, there is provided an apparatus for controlling a ProSe service in an eNB of a communication system, the apparatus including: a first sending unit configured to send access class barring information for carrying out the ProSe service, to a UE authorized to carry out the ProSe service in a first PLMN, wherein the access class barring information is PLMN specific or applicable to all of PLMNs of a shared cell; a receiving unit configured to receive a request from the UE for a radio resource for carrying out the ProSe service; and a second sending unit configured to send information about the radio resource for carrying out the ProSe service, to the UE in response to the request from the UE for the radio resource for carrying out the ProSe service, wherein the information about the radio resource includes a time window corresponding to the radio resource.

According to a sixth aspect of the invention, there is provided an apparatus for controlling a ProSe service in a UE of a communication system, a deciding unit configured to make an access decision according to access class barring information for carrying out the ProSe service in a first PLMN, from an eNB, and if the decision succeed, to send an RRC connection request to the eNB for setting up an RRC connection with the eNB, wherein the UE is authorized to carry out the ProSe service in the first PLMN; a third sending unit configured to send a request to the eNB for a radio resource for carrying out the ProSe service; and a service carrying-out unit configured to carry out the ProSe service in a time window corresponding to the radio resource in the information about the radio resource for carrying out the ProSe service, from the eNB.

The respective aspects of the invention will become more apparent is from the following description of particular embodiments thereof.

BRIEF DESCRIPTION OF DRAWINGS

The other features, objects and advantages of the invention will become more apparent upon reading the detailed description of non-limiting embodiments thereof taken with reference to the drawings in which.

Identical or like reference numerals will denote identical or corresponding components or features throughout the drawings.

DETAILED DESCRIPTION OF EMBODIMENTS

Figure 1:
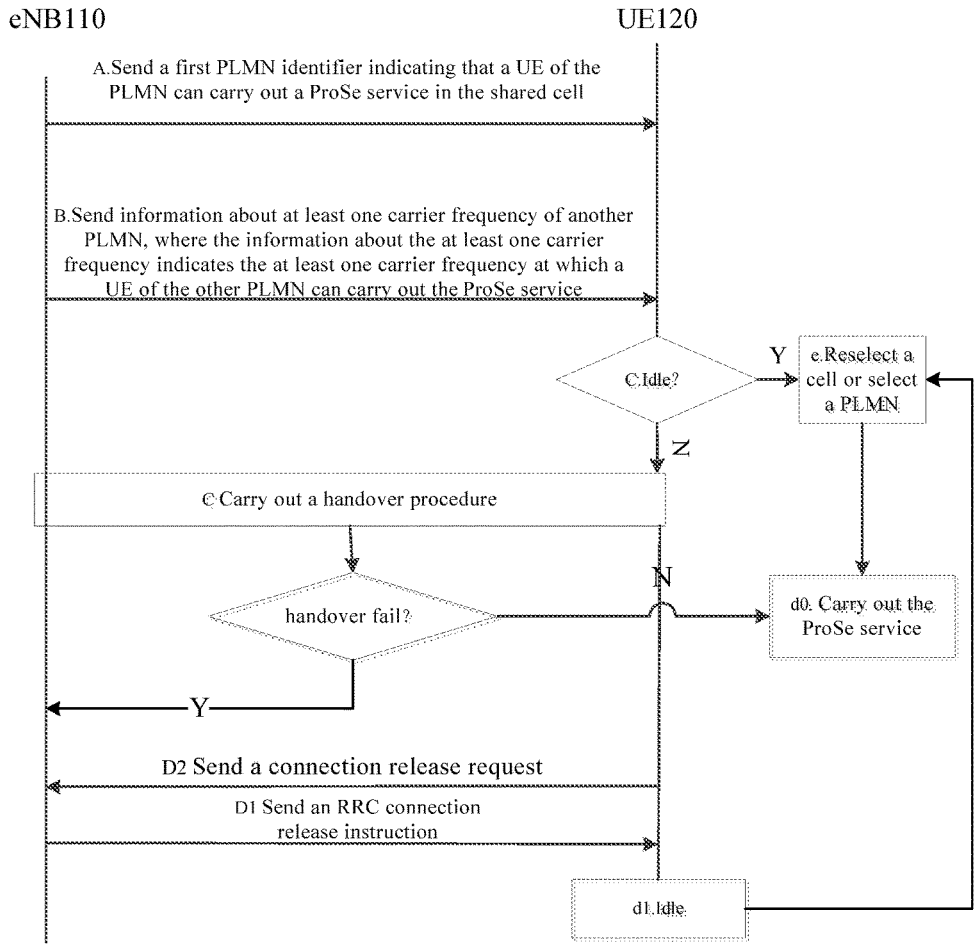
FIG. 1 illustrates a flow chart of a method of controlling a ProSe service according to an embodiment of the invention.

Reference will be made to the drawings, which constitute a part of the invention, in the following detailed description of preferred embodiments. The drawings exemplarily illustrate particular embodiments in which the invention can be embodied. The exemplary embodiments are not intended to exhaust all the embodiments of the invention. It shall be noted that although the steps of the method in the invention are described in a particular order, this will not require or suggest that these operations be performed in the particular order or all the illustrated operations must be performed for a desirable result, but on the contrary, the steps described in this context can be performed in an alternative order. Additionally or alternatively some of the steps can be omitted, more than one of the steps can be combined into one step and/or one of the steps can be decomposed into more than one step.

In a shared cell, a radio resource for a ProSe service will be allocated specific to a PLMN. If a cell can be shared by a plurality of PLMNs, the cell will be referred to as a shared cell. Those skilled in the art can appreciate that a ProSe service in the invention can be ProSe direct communication, or can be a ProSe direct discovery, or can be both a ProSe direct discovery and ProSe direct communication or any other access or connection related to device to device communication.

For a ProSe direct discovery, a System Information Block (SIB) indicates a configured pool of resources for a direct discovery, in the type 1, associated with the specific PLMN, and/or the SIB indicates whether to allow a direct discovery in the type 2, associated with the specific PLMN to be carried out.

For ProSe direct communication, the SIB indicates whether to allow direct communication in the mode 1, associated with the specific PLMN.

For a UE supporting a direct discovery in the type 1, when the UE camps on the shared cell, if the SIB of the shared cell indicates a configured pool of resources for a direct discovery, in the type 1, associated with the specific PLMN, then the UE authorized to announce a ProSe direct discovery in these PLMNs can announce discovery information (for a direct discovery) over these resources. For a UE supporting a direct discovery in the type 2, when the UE camps on the is shared cell, if the SIB of the shared cell indicates that a direct discovery in the type 2, associated with the specific PLMN is allowed to be carried out, then the UE authorized to announce a ProSe direct discovery in these PLMNs can request the shared cell for allocating a resource for announcing discovery information; otherwise, the UE will not be allowed to announce a discovery. For example, if the UE is not authorized to announce a ProSe direct discovery or is authorized to announce a ProSe direct discovery in another PLMN, then it can not announce a discovery (in the type 1 or the type 2) in the current shared cell.

For a UE supporting direct communication in the type 1, when the UE camps on the shared cell, if the SIB of the shared cell indicates that direct communication associated with the specific PLMN is allowed, then the UE authorized to carry out ProSe direct communication in these PLMNs can request the shared cell for a transmission resource for direct communication; otherwise, the UE will not be allowed for direct communication, for example, if the UE is not authorized to carry out ProSe direct communication or is authorized to carry out direct communication in another PLMN, then the UE can not obtain a transmission resource for direction communication from an eNB of the shared cell or can not request the eNB of the shared cell for a transmission resource for direction communication.

In a non-shared cell, the identifier of only one PLMN is broadcast in the SIB1, and a configured radio resource for a ProSe service (in a newly defined SIB other than the SIB1) is allocated with the PLMN. It shall be noted that at this time the SIB (the newly defined SIB) will not indicate separately that the configured radio resource for the ProSe service is associated with the PLMN because any configuration of the non-shared cell will be applicable to the PLMN.

In a shared cell, the identifiers of a plurality of PLMNS are broadcasted in the SIB1, and a radio resource for the ProSe service will be allocated by indicating which PLMN (or PLMNS) is provided with the is configured radio resource for the ProSe service.

In order to allocate a radio resource for carrying out a ProSe service for a specific PLMN, FIG. 1 illustrates a flow chart of a method of controlling a ProSe service according to an embodiment of the invention.

Referring to FIG. 1, firstly in the step A, an eNB 110 sends in a shared cell a first PLMN identifier to a UE of the shared cell, where the first PLMN identifier indicates that a UE of the first PLMN can carry out the ProSe service in the shared cell controlled by the eNB and shared by the first PLMN and another PLMN. It shall be noted that the UE carrying out the ProSe service typically needs to be authorized but will not be limited to an authorized UE, although the technical solution of the invention will be set forth taking an authorized UE as an example in the embodiment of the invention where as described above, the UE of the first PLMN can carry out the ProSe service in the shared cell, which means that a UE authorized in the first PLMN can carry out the ProSe service in the shared cell.

Those skilled in the art shall appreciate that the eNB 110 can send the first PLMN identifier in an SIB (other than an SBI1) to the UE of the shared cell, e.g., a newly defined SIB to indicate an allocated radio resource for the ProSe service, including whether to allow a direct discovery to be carried out and/or whether to allow direct communication to be carried out, and the corresponding configured resource, where the newly defined SIB indicates separately that the configured radio resource for the ProSe service is associated with the first PLMN, and particularly the SIB includes the first PLMN identifier. It shall be particularly noted that if the allocated radio resource for the ProSe service, configured by the shared cell (the SIB1 indicates the first PLMN and the other PLMN, where the first PLMN is a primary PLMN) is available to only the primary PLMN, then the newly added SIB will not indicate that the configured radio resource for the ProSe service is associated with the primary PLMN because the allocated radio resource for the ProSe service, is configured in the SIB will be available only to a primary PLMN, as prescribed in the protocol.

In the step B, the eNB 110 sends in the shared cell information about at least one carrier frequency of the other PLMN to the UE of the shared cell, e.g., in an SIB, where the information about the at least one carrier frequency indicates the at least one carrier frequency at which a UE of the other PLMN can carry out the ProSe service.

Those skilled in the art shall appreciate that the SIB1 of the shared cell indicates at least one first PLMN (which will not be limited to the primary PLMN) and at least another PLMN. For example, there are one first PLMN and another PLMN in the shared cell, and the eNB 110 sends in the shared cell the first PLMN identifier to the UE of the shared cell, so the authorized UE of the first PLMN is allowed to carry out the ProSe service in the shared cell, and the authorized UE 120 of the other PLMN (in the coverage area of the shared cell) is not allowed to carry out the ProSe service in the shared cell; and if the authorized UE 120 of the other PLMN intends to carry out the ProSe service, then it should know at which carrier frequency the authorized UE of the PLMN can be provided with the ProSe service.

In the step C, if the authorized UE 120 of the other PLMN intends to carry out the ProSe service in the other PLMN, and is in the idle state, then the UE will reselect a cell (including selecting a PLMN if the PLMN currently selected by the UE is not a PLMN in which the UE is authorized to carry out the ProSe service); and if the UE 120 of the other PLMN intends to carry out the ProSe service in the other PLMN, and is in the RRC connected state, then the UE will sends an indicator of the intension to carry out the ProSe service to the eNB 110.

The eNB 110 performs a handover to the appropriate cell, selected by the authorized UE 120 of the other PLMN, for carrying out the ProSe service. If the handover succeeds, then the authorized UE 120 of the other PLMN will be handed over from the shared cell to the appropriate cell for is carrying out the ProSe service.

In the step D1, if the handover fails, then the eNB 110 will send an RRC connection release instruction to the UE 120 of the other PLMN to instruct the authorized UE of the other PLMN to release an RRC connection with the eNB to enter the idle state. If the authorized UE 120 of the other PLMN has not been handed over from the shared cell to another appropriate cell for carrying out the ProSe service in a period of time after sending the indicator of the intension to carry out the ProSe service to the eNB, which means that the handover procedure fails, then the authorized UE 120 of the other PLMN will receive the RRC connection release instruction from the eNB 110, and release the RRC connection with the eNB 110 and enter the idle state, in response to the RRC connection release instruction.

Optionally if the UE 120 has not been handed over from the shared cell to another appropriate cell for carrying out the ProSe service in a period of time (e.g., predefined one second) after sending the indicator of the intension to carry out the ProSe service to the eNB, which means that the handover procedure fails, then in the step D2, the authorized UE 120 of the other PLMN can alternatively send a release connection request to the eNB 110, for example, through the Non-Access Stratum (NAS), and the eNB 110 will receive the release connection request from the UE of the other PLMN, and send an RRC connection release instruction to the authorized UE 120 of the other PLMN, in response to the received release connection request (where the eNB 110 shall interact with a core network so that the core network will send release signaling to the eNB 110), to instruct the authorized UE 120 of the other PLMN to release an RRC connection with the eNB 110 to enter the idle state.

Figure 2:
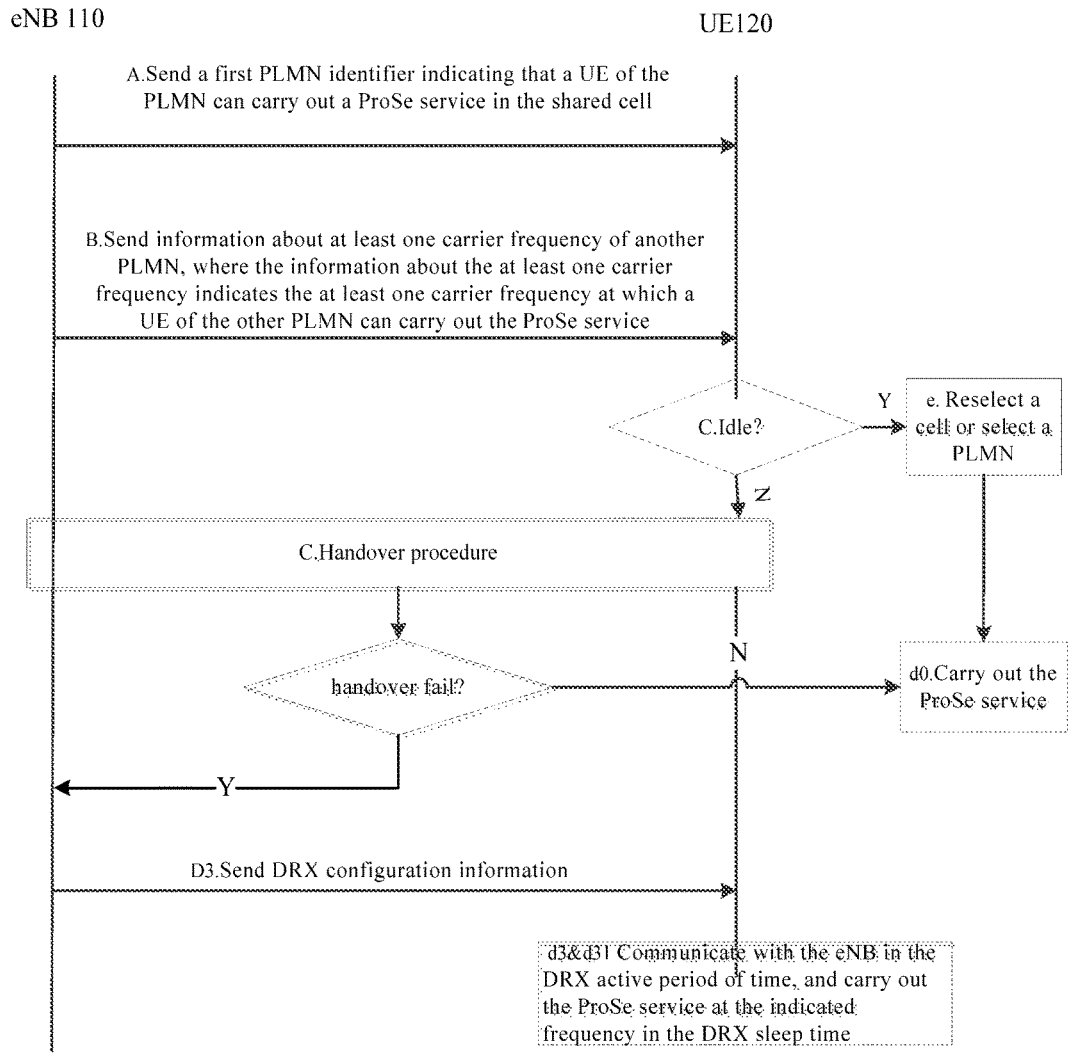
FIG. 2 illustrates a flow chart of a method of controlling a ProSe service according to another embodiment of the invention.

Optionally, as illustrated in FIG. 2, according to another embodiment of the invention, in the step D3, if the handover fails, then the eNB 110 will send DRX configuration information to the authorized UE of the other PLMN, where the DRX configuration information indicates an sleep time is in which the authorized UE 120 of the other PLMN carries out the ProSe service. If the authorized UE 120 of the other PLMN has not been handed over from the shared cell to the other cell in a period of time after sending the indicator of the intension to carry out the ProSe service to the eNB 110, which means that the handover procedure fails, then the authorized UE 120 of the other PLMN will receive the DRX configuration information from the eNB 110, and carry out the ProSe service at the at least one carrier frequency in the DRX sleep time according to the DRX configuration information, and the information about the at least one carrier frequency in the step B.

The failure of the handover as referred to in the invention refers to that the UE can not be handed over to an appropriate for carrying out the ProSe service, at any carrier frequency of the other PLMN, and also refers to a failure of a handover request in the handover procedure.

Figure 3:
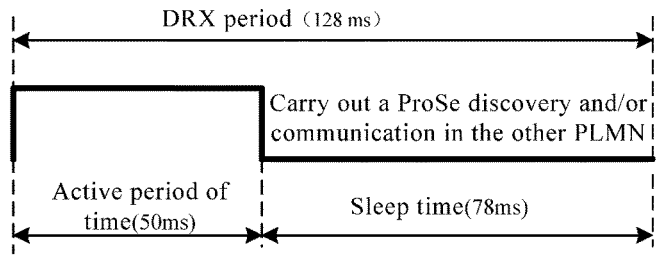
FIG. 3 illustrates a schematic diagram of a period of DRX in FIG. 2.

As illustrated in FIG. 3, the eNB of the shared cell can configure a DRX period for the authorized UE of the other PLMN. For example, the DRX period is 128 ms including a DRX sleep time of 78 ms, and a DRX active period of time of 50 ms. The eNB can configure the authorized UE of the other PLMN with the DRX period via RRC signaling. The UE can carry out a communication service in the shared cell and with the controlling eNB of the shared cell in the active period of time; and the UE can carry out the ProSe service at the carrier frequency indicated in the step B in the sleep time. The UE can also send a recommended DRX configuration parameter to the controlling eNB of the shared cell (where the UE recommends an appropriate DRX configuration parameter to the eNB according to a period of time required for carrying out the ProSe service at the carrier frequency indicated in the step B), and the controlling eNB of the shared cell can also modify the recommended DRX configuration parameter for the UE.

In the step e, if the authorized UE 120 of the other PLMN is in the idle state, then the authorized UE 120 of the other PLMN will preferentially is select a cell at the at least one carrier frequency, and selects a PLMN and reselects the appropriate cell for carrying out the ProSe service at the at least one carrier frequency to carry out the ProSe service. In this process, the UE 120 determines that all the carriers indicated in the step B have the highest priority.

Figure 4:
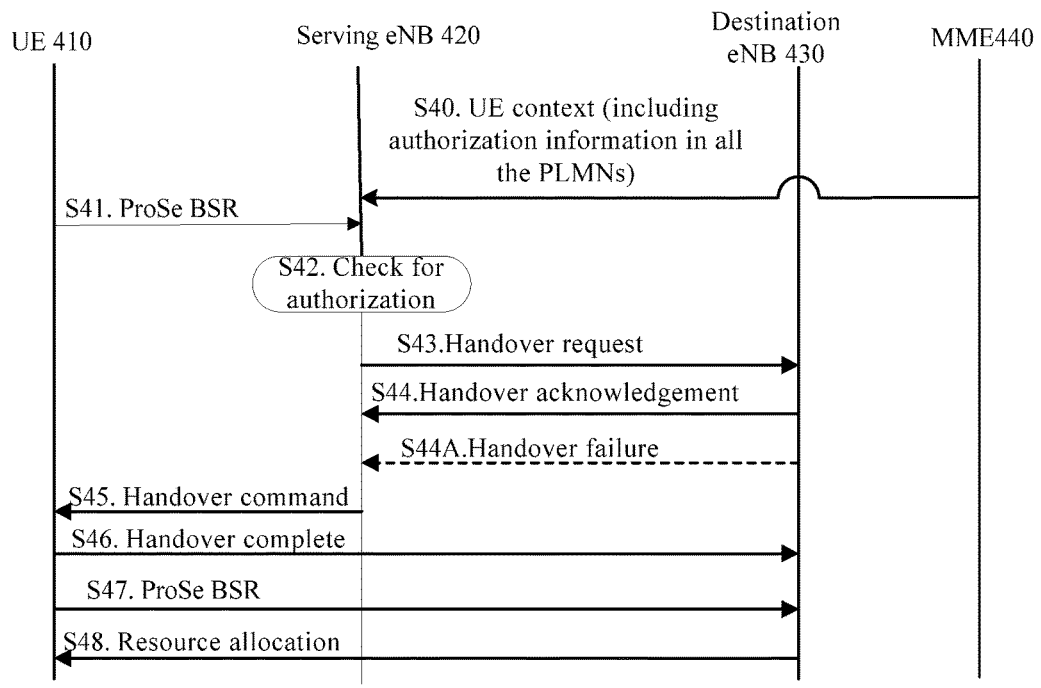
FIG. 4 illustrates a flow chart of the handover procedure in FIG. 1 and FIG. 2.

FIG. 4 illustrates a flow chart of the handover procedure in FIG. 1 and FIG. 2, where in the step S40, a Mobility Management Entity (MME) 440 sends context information of a UE 410 to a serving eNB 420 (e.g., in an initial context setup request). Typically the context information of the UE 410 includes authorization information for the UE to carry out a ProSe service in one or more PLMNs. For example, in an embodiment of the invention, the context information of the UE 410 includes authorization information of the UE 410 in the other PLMN. The current PLMN is a PLMN reported by the UE 410 in an RRC connection setup complete message, e.g., a first PLMN.

In the step S41, if the UE 410 intends to carry out the ProSe service in the other PLMN, then the UE 410 will send a Buffer status Report (BSR) about the ProSe service to the serving eNB 420.

In the step S42, the serving eNB 420 will check whether the UE 410 is authorized to carry out the ProSe service. If the serving eNB 420 discovers that the UE 410 is authorized in the other PLMN, but the current cell serves only an authorized UE of the PLMN 1 to carry out the ProSe service, then the serving eNB 420 decides to hand over the UE 410 to the carrier frequency indicated in the step B so that the UE 410 can carry out the ProSe service. The serving eNB 420 can configure the UE 410 with a measurement parameter for the carrier frequency indicated in the step B so that the UE 410 will measure and report a candidate cell at the carrier frequency indicated in the step B, for the handover.

In the step S43, if the serving eNB 420 can locate an appropriate cell at the carrier frequency indicated in the step B, then the serving eNB 420 will send a handover request to a destination eNB 430 of the UE 410, is where the handover request can also include ProSe related information, e.g., the BSR of the ProSe service, so that the destination eNB 420 will know that the UE 410 intends to carry out ProSe direct communication. In this case, if the UE 410 is authorized to carry out ProSe direct communication, then the destination eNB 430 can also allocate a resource for ProSe direct communication in a handover response. Thus the UE 410 will not further report the BSR of the ProSe service to the destination eNB 430 after the handover.

In the step S44, if the destination eNB 430 allows the handover, then the destination eNB 430 will send a handover acknowledgement to the serving eNB 420.

In the step S44A, if the destination eNB 430 does not allow the handover, then the destination eNB 430 will send a handover request failure message to the serving eNB 420.

In the step S45, the serving eNB 420 sends a handover command to the UE 410 upon reception of the handover acknowledgement from the destination eNB.

In the step S46, if the UE receives the handover command from the serving eNB 420, then the UE 410 will be handed over to the destination eNB 430 (the cell controlled by the destination eNB), and send a handover complete message to the destination eNB 430.

In the step S47, the UE 410 sends the BSR about the ProSe service to the destination eNB 430 upon completing the handover procedure. This step will be skipped if the handover request includes the ProSe related information.

In the step S48, the destination eNB 430 checks whether the UE 410 is authorized to carry out the ProSe service in the current PLMN, and if so, then the destination eNB 430 will send information about a corresponding allocated resource for carrying out the ProSe service to the UE 410.

Figure 5:
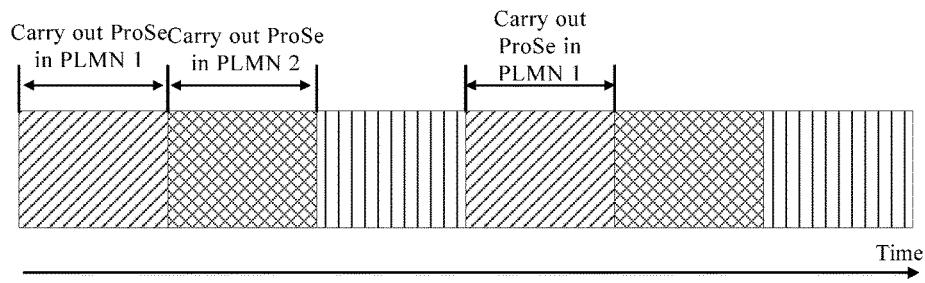
FIG. 5 illustrates a schematic diagram of resources allocated for carrying ProSe services in different PLMNs.

As illustrated in FIG. 5, different PLMNs can carry out a direct discovery and/or communication over radio resources in different periods is of time in a shared network, and at this time authorized UEs of the PLMNs in the shared cell can carry out ProSe services in the different periods of time. An SIB will indicate a relationship between the PLMN and the period of time in which the ProSe service is carried out over the radio resource. For example, the SIB will indicate the period of time corresponding to the radio resource over which the UE authorized in the PLMN 1 can carry out the ProSe service.

If the UE (the UE selects a PLMN which is the PLMN 1) intends to carry out the ProSe service over the radio resource, then the UE will send a request for the radio resource over which the UE intends to carry out the ProSe service, or the BSR of the ProSe service, to the serving cell (of which the SIB1 indicates that the cell is shared by the PLMN 1 and the PLMN 2). If the serving cell determines that the UE is a UE authorized to carry out the ProSe service in the PLMN 1, then the serving cell will allocate for the UE the radio resource for carrying out the ProSe service, and a corresponding time window. The UE can only carry out the ProSe service over the allocated radio resource in the allocated time window.

If the UE (the UE selects a PLMN which is the PLMN 1, and is in the connected state) is authorized in the PLMN 2, and intends to carry out the ProSe service (e.g., direct communication in the mode 2 or a direct discovery in the type 1, where the UE itself selects a radio resource for carrying out the ProSe service) in the PLMN 2 (assuming that this is granted by the serving cell), then the UE will notify the serving eNB of some period of time in which the UE will carry out the ProSe service in the PLMN 2, so that the serving eNB can avoid the UE from being scheduled in the serving cell in the period of time.

Figure 6:
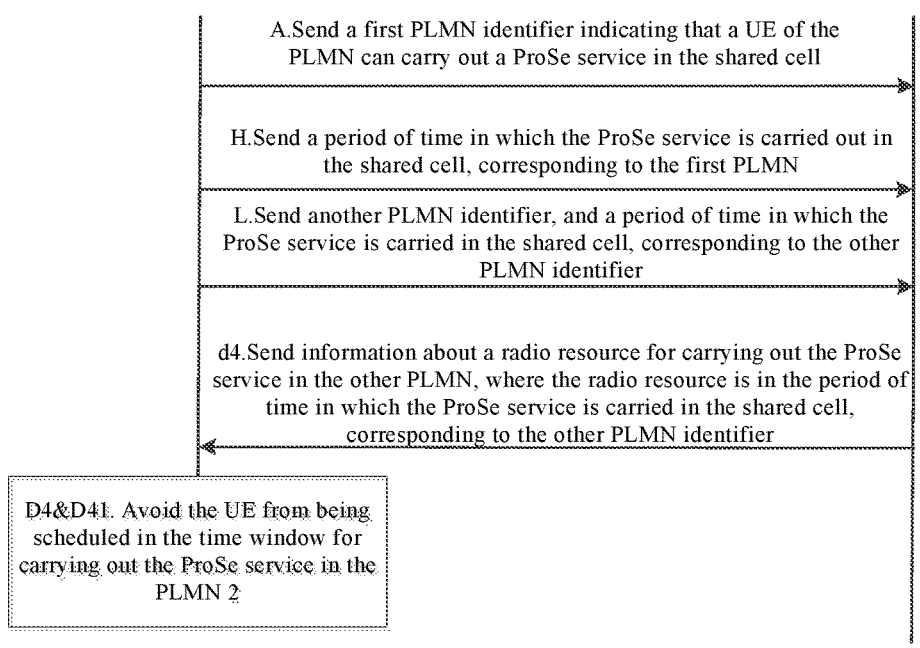
FIG. 6 illustrates a flow chart of a method of controlling a ProSe service according to a further embodiment of the invention.

FIG. 6 illustrates a flow chart of a method of carrying out a ProSe service according to a further embodiment of the invention.

Referring to FIG. 6, firstly in the step A, an eNB 610 sends in a shared cell a first PLMN identifier to a UE 620 of the shared cell.

In the step H, the eNB sends a first period of time in which a ProSe is service is carried in the shared cell, corresponding to the first PLMN to the UE.

In the step L, the eNB sends another PLMN identifier, and a second period of time in which the ProSe service is carried in the shared cell, corresponding to the other PLMN identifier to the UE, where the shared cell is controlled by the eNB and shared by the first PLMN and the other PLMN.

In the step D4, the UE 620 of the other PLMN (the UE selects a PLMN which is the first PLMN, and is in the connected state) sends information about a radio resource over which the ProSe service is carried out in the other PLMN, to the eNB 610, where the information about the radio resource includes a time window corresponding to the radio resource, in the second period of time, and the information about the radio resource instructs the eNB 610 not to schedule the UE 620 of the other PLMN in the shared cell in the time window. The UE of the other PLMN is authorized in the other PLMN.

In the step D41, the eNB 610 receives the information about the radio resource over which the ProSe service is carried out in the other PLMN, from the UE 620, and the eNB 610 avoids the UE 620 from being scheduled in the shared cell in the time window corresponding to the radio resource included in the information about the radio resource.

Those skilled in the art can appreciate that the time window in the step D4 can be information about a subframe, for example, or can be any other information representing a period of time.

The technical solution of the invention can further include an apparatus, for example, in an eNB, for performing the exemplary methods as illustrated in FIG. 1, FIG. 2, FIG. 4 and FIG. 6.

The technical solution of the invention can further include an apparatus, for example, in a UE, for performing the exemplary methods as illustrated in FIG. 1, FIG. 2, FIG. 4 and FIG. 6.

The UE shall access the network to obtain authorization information, before carrying out the ProSe service. After obtaining the authorization information, the UE will also access network to request for allocating a resource (for example, for direct communication in the mode 1 and a direct discovery in the type 2, and direct communication in the mode 2 and a direct discovery in the type 1, the UE itself can select the radio resource for the ProSe service without accessing the network) for carrying out the ProSe service. If a large number of UEs intending to carry out the ProSe services access the network concurrently, then the network may be overloaded, thus wasting radio resources (particularly random access resources) and hindering the other UEs from carrying out normal services. Thus it is highly necessary to introduce a new Access Class Barring (ACB) mechanism for the ProSe service to the communication network.

The SIB can indicate a new access barring parameter for carrying out the ProSe service. The new access barring parameter can be a PLMN specific parameter or can be a common parameter applicable to all the PLMNs (all the PLMNs of the shared cell). The new access barring parameter can be Access Class (AC) specific (that is, the AC0 to the AC15 can be configured with different access barring parameters) or a common access barring parameter applicable to all the access classes (that is, the AC0 to the AC15 can be configured with a common access barring parameter). Since different resources are required for the ProSe service, the new access barring parameter can alternatively be configured separately for a direct discovery or direct communication.

If the UE intends to access the network to obtain authorization information or to carry the ProSe service, then the UE will perform an access check, that is, perform an access control check against the access barring parameter, where the UE can perform the access control check at either the Access Stratum (AS) or the Non-Access Stratum (NAS). If the UE performs the access check at the AS, then the NAS will indicate to the AS that the ProSe service is carried out over the RRC connection, thus possibly by introducing a new establishment cause or reusing an existing is establishment cause. If the UE performs the access control check at the NAS, then after the UE obtains the new access barring parameter from the SIB, for example, the UE will send the new access barring parameter to the higher layer (i.e., the NAS), which further performs the access check. Only if a result of the access check is NOT BARRED, then the UE can initiate the RRC connection, and access the network to obtain the authorization information or to carry out the ProSe service.

Figure 7:
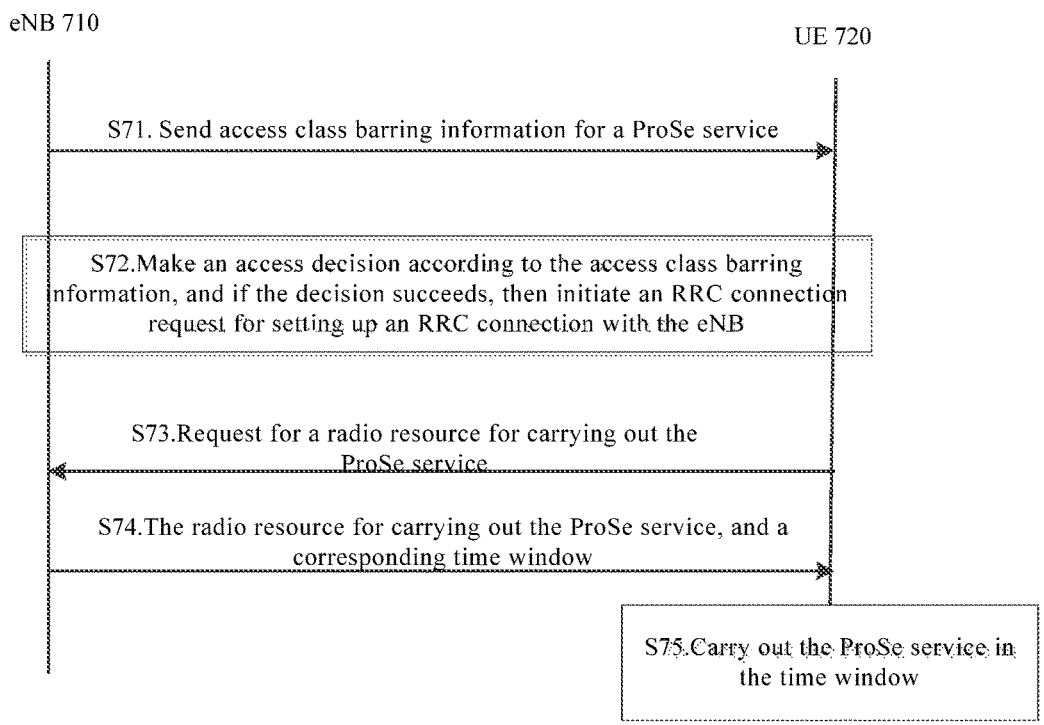
FIG. 7 illustrates a flow chart of an access barring method of according to an embodiment of the invention.

FIG. 7 illustrates a flow chart of an access barring method according to an embodiment of the invention.

Referring to FIG. 7, in the step S71, an eNB 710 sends access class barring information for carrying out the ProSe service to a UE 720, e.g., in an SIB, where the UE 720 is authorized to carry out the ProSe service in a first PLMN.

In the step S72, the UE 720 makes an access decision according to the access class barring information for carrying out the ProSe service in the first PLMN, from the eNB 710, and if the access succeeds, then the UE 720 will send an RRC connection request to the eNB 710 for setting up an RRC connection with the eNB 710.

In the step S73, the UE 720 sends a request to the eNB 720 for a radio resource for carrying out the ProSe service.

In the step S74, the eNB 710 determines that the UE 720 is authorized, in response to the request from the UE 720 for a radio resource for carrying out the ProSe service, and then sends information about the radio resource for carrying out the ProSe service, to the UE 720, where the information about the radio resource carries a time window corresponding to the radio resource.

In the step S75, the UE 720 carries out the ProSe service in the time window corresponding to the radio resource in the information about the radio resource for carrying the ProSe service, from the eNB 710.

If the UE 720 intends to carry out the ProSe service, but the access decision is BARRED according to an access barring parameter, then the UE 720 can not initiate an RRC connection request to the current cell for obtaining authorization information related to the ProSe service, or request the eNB 710 for the radio resource for carrying out the ProSe service. The UE 720 can select a PLMN or reselect a cell to access a cell in which the intended ProSe service is allowed to be carried out.

Figure 8:
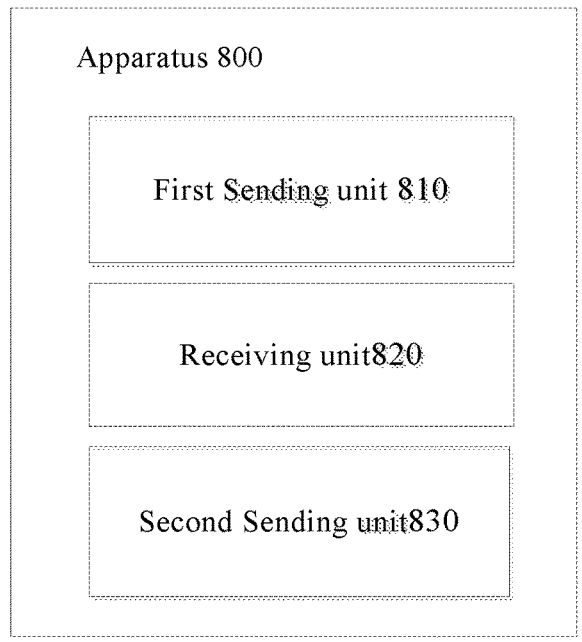
FIG. 8 illustrates a schematic diagram of a device for controlling a ProSe service in an eNB of a communication system.

FIG. 8 illustrates a schematic diagram of a device for controlling a ProSe service in an eNB of a communication system, where the device includes an apparatus 800 which can be or embodied as the eNB 710 in the embodiment described above with reference to FIG. 7, for example.

As illustrated in FIG. 8, the apparatus 800 includes a first transmitting unit 810 configured to send access class barring information for carrying out the ProSe service, to a UE authorized to carry out the ProSe service in a first PLMN, where the access class barring information is PLMN specific or applicable to all of PLMNs of a shared cell; a receiving unit 820 configured to receive a request from the UE for a radio resource for carrying out the ProSe service; and a second transmitting unit 830 configured to send information about the radio resource for carrying out the ProSe service, to the UE in response to the request from the UE for the radio resource for carrying out the ProSe service, where the information about the radio resource includes a time window corresponding to the radio resource.

Figure 9:
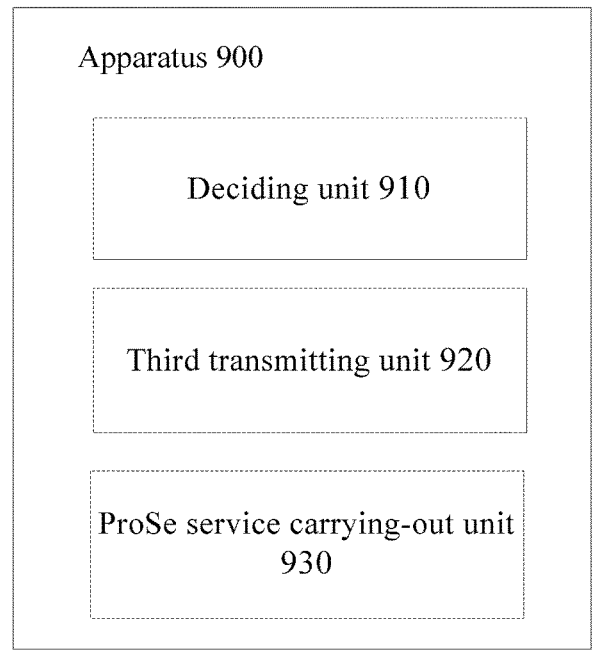
FIG. 9 illustrates a schematic diagram of a device for controlling a ProSe service in a UE of a communication system.

FIG. 9 illustrates a schematic diagram of a device for controlling a ProSe service in a UE of a communication system, where the devices includes an apparatus 900 which can be or embodied as the UE 720 in the embodiment described above with reference to FIG. 7, for example.

As illustrated in FIG. 9, the apparatus 900 includes a deciding unit 910 configured to make an access decision according to access class barring information for carrying the ProSe service in a first PLMN, from an eNB, and if the decision succeed, to send an RRC connection request to the eNB for setting up an RRC connection with the eNB, where the UE is authorized to carry out the ProSe service in the first PLMN; a third is transmitting unit 920 is configured to send a request to the eNB for a radio resource for carrying the ProSe service; and a ProSe service carrying-out unit 930 configured to carry out the ProSe service in a time window corresponding to the radio resource in the information about the radio resource for carrying out the ProSe service, from the eNB.

It shall be noted that the foregoing embodiments are merely illustrative but not intended to limit the invention. Any technical solutions without departing from the spirit of the invention shall fall into the scope of invention, including the use of different technical solutions appearing in different embodiments as arranged in any arrangement combination to advantage. Moreover any reference numerals in the claims shall not be construed as limiting the claims in question; and the term "comprising" will not preclude another device(s) or step(s) which is (are) listed in the other claim(s) or the description.

The invention claimed is:

1. A method of controlling a ProSe service in an eNB of a communication system, the method comprising:
   sending, in a shared cell, a first PLMN identifier to a UE of the shared cell, wherein the first PLMN identifier indicates that a UE of the first PLMN is authorized to carry out the ProSe service in the shared cell controlled by the eNB and shared by the first PLMN and other PLMN;
   sending information about at least one carrier frequency of the other PLMN to the UE of the shared cell in the shared cell, wherein the information about the at least one carrier frequency indicates the at least one carrier frequency at which a UE of the other PLMN is authorized to carry out the ProSe service;
   determining a radio resource over which the ProSe service is carried out according to the first PLMN and the at least one carrier frequency.

2. The method according to claim 1, wherein the method further comprises:
   in response to the UE of the other PLMN intending to carry out the ProSe service in the other PLMN, determining that the UE of the other PLMN is in a connected state; and
   in response to the determination, initiating a handover procedure.

3. The method according to claim 2, wherein after the determining, the method further comprises:
   in response to the handover procedure failing, sending DRX configuration information to the UE of the other PLMN, wherein the DRX configuration information indicates a sleep time in which the UE of the other PLMN carries out the ProSe service.

4. The method according to claim 1, wherein after the sending, the method further comprises:
   sending a first period of time in which the ProSe service is carried in the shared cell, corresponding to the first PLMN to the UE;
   sending the other PLMN identifier, and a second period of time in which the ProSe service is carried in the shared cell, corresponding to the other PLMN identifier to the UE; and
   receiving information about a radio resource for carrying out the ProSe service in the other PLMN, from the UE of the other PLMN, wherein the information about the radio resource comprises a time window corresponding to the radio resource, and the time window locates in the second period of time.

5. The method according to claim 4, wherein after the receiving, the method further comprises:
   avoiding the UE of the other PLMN from being scheduled in the shared cell in the time window.

6. A method of controlling a ProSe service in a UE of a communication system, the method comprising:
   receiving a first PLMN identifier from an eNB of a shared cell, wherein the first PLMN identifier indicates that a UE of the first PLMN is authorized to carry out the ProSe service in the shared cell controlled by an eNB and shared by the first PLMN and other PLMN;
   receiving information about at least one carrier frequency of the other PLMN from the eNB, wherein the information about the at least one carrier frequency indicates the at least one carrier frequency at which a UE of the other PLMN is authorized to carry out the ProSe service;
   determining a radio resource over which the ProSe service is carried out according to the first PLMN and the at least one carrier frequency.

7. The method according to claim 6, wherein after the receiving, the method further comprises:
   in response to the UE of the other PLMN intending to carry the ProSe service in the other PLMN, and being in an idle state, reselecting a cell; or
   in response to the the UE of the other PLMN intending to carry the ProSe service in the other PLMN, and being in a connected state, sending an indicator of the intension to carry out the ProSe service, to the eNB.

8. The method according to claim 7, wherein after the reselecting or sending, the method further comprises:
in response to the handover succeeding, switching the UE of the other PLMN to an appropriate cell for carrying out the ProSe service to carry out the ProSe service.

9. The method according to claim 7, wherein after the reselecting or sending, the method further comprises:
in response to the UE of the other PLMN having not been handed over from the shared cell to another cell in a period of time after sending the indicator of the intension to carry out the ProSe service to the eNB, receiving an RRC connection release instruction from the eNB, and releasing an RRC connection with the eNB and entering the idle state, in response to the RRC connection release instruction; or
in response to the UE of the other PLMN having not been handed over from the shared cell to another cell in a period of time after sending the indicator of the intension to carry out the ProSe service to the eNB, sending a release connection request to the eNB, and releasing an RRC connection with the eNB and entering the idle state, in response to a received RRC connection release instruction from the eNB.

10. The method according to claim 7, wherein the method further comprises:
in response to the UE of the other PLMN being in the idle state, selecting, by the UE of the other PLMN, preferentially a cell at the at least one carrier frequency, and selecting a PLMN and reselecting the appropriate cell for carrying out the ProSe service at the at least one carrier frequency to carry out the ProSe service.

11. The method according to claim 7, wherein after the reselecting or sending, the method further comprises:
in response to the UE of the other PLMN having not been handed over from the shared cell to another cell in a period of time after sending the indicator of the intension to carry out the ProSe service to the eNB, receiving DRX configuration information from the eNB, wherein the DRX configuration information comprises a sleep time in which the UE of the other PLMN carries out the ProSe service.

12. The method according to claim 6, wherein after the receiving, the method further comprises:
receiving a first period of time in which the ProSe service is carried out in the shared cell, corresponding to the first PLMN, from the eNB;
receiving the other PLMN identifier, and a second period of time in which the ProSe service is carried out in the shared cell, corresponding to the other PLMN identifier, from the eNB; and
sending information about a radio resource over which the ProSe service is carried out in the other PLMN, to the eNB, wherein the information about the radio resource comprises a time window corresponding to the radio resource, in the second period of time, and the information about the radio resource is configured to instruct the eNB not to schedule the UE of the other PLMN in the shared cell in the time window.

13. A method of controlling a ProSe service in an eNB of a communication system, the method comprising:
sending access class barring information for carrying out the ProSe service to a UE authorized to carry out the ProSe service in a first PLMN;
receiving a request from the UE for a radio resource for carrying out the ProSe service after establishing an RRC connection with the UE; and
sending information about the radio resource for carrying out the ProSe service to the UE in response to the request from the UE for the radio resource for carrying out the ProSe service, wherein the information about the radio resource comprises a time window corresponding to the radio resource.

14. The method according to claim 13, wherein the access class barring information is PLMN specific or applicable to all of PLMNs of the shared cell;
wherein the access class barring information comprises:
ProSe discovery barring information and/or ProSe communication barring information; and
PLMN identifier information indicating PLMNs to which the access class barring information is applicable.

15. A method for controlling a ProSe service in a UE of a communication system, the method comprising:
making an access decision according to access class barring information for carrying the ProSe service in a first PLMN, from an eNB, and, in response to an access success, sending an RRC connection request to the eNB for setting up an RRC connection with the eNB, wherein the UE is authorized to carry out the ProSe service in the first PLMN;
sending a request for a radio resource for carrying out the ProSe service to the eNB; and
carrying out the ProSe service in a time window corresponding to the radio resource in information about the radio resource for carrying out the ProSe service, from the eNB.

16. The method according to claim 2, wherein after the determining, the method further comprises:
in response to the handover procedure failing, sending an RRC connection release instruction to the UE of the other PLMN to instruct the UE of the other PLMN to release an RRC connection with the eNB to enter an idle state.

17. The method according to claim 2, wherein after the determining, the method further comprises:
in response to the handover procedure failing, receiving a release connection request from the UE of the other PLMN, and sending an RRC connection release instruction to the UE of the other PLMN, in response to the received release connection request, to instruct the UE of the other PLMN to release an RRC connection with the eNB to enter an idle state.

18. A user equipment comprising:
at least one processor;
and at least one memory including computer program code;
the at least one memory and the computer program code configured to, with the at least one processor, cause the user equipment at least to:
receive a first PLMN identifier from an eNB of a shared cell, wherein the first PLMN identifier indicates that a UE of the first PLMN is authorized to carry out a ProSe service in the shared cell controlled by an eNB and shared by the first PLMN and other PLMN;
receive information about at least one carrier frequency of the other PLMN from the eNB, wherein the information about the at least one carrier frequency indicates the at least one carrier frequency at which a UE of the other PLMN is authorized to carry out the ProSe service;

determine a radio resource over which the ProSe service is carried out according to the first PLMN and the at least one carrier frequency.

19. The user equipment according to claim 18, wherein said at least one processor is configured to execute said computer-readable instructions to cause said user equipment to, after receiving the first PLMN identifier:
- if the UE of the other PLMN intends to carry the ProSe service in the other PLMN, and is in an idle state, reselect a cell; or
- if the UE of the other PLMN intends to carry the ProSe service in the other PLMN, and is in a connected state, send an indicator of the intension to carry out the ProSe service, to the eNB.

\* \* \* \* \*